United States Patent [19]

Takeuchi et al.

[11] Patent Number: 4,644,316
[45] Date of Patent: Feb. 17, 1987

[54] POSITIVE TEMPERATURE COEFFICIENT THERMISTOR DEVICE

[75] Inventors: Michikazu Takeuchi; Yoshiaki Ishizu, both of Yuri, Japan

[73] Assignee: TDK Corporation, Tokyo, Japan

[21] Appl. No.: 779,687

[22] Filed: Sep. 24, 1985

[30] Foreign Application Priority Data

Sep. 25, 1984 [JP] Japan .................... 59-144904[U]

[51] Int. Cl.⁴ .............................................. H01C 7/10
[52] U.S. Cl. .................................... 338/22 R; 338/7; 219/544
[58] Field of Search ................ 338/22 R, 22 SD, 23, 338/24, 7-10; 219/544

[56] References Cited

U.S. PATENT DOCUMENTS

| 4,086,467 | 4/1978 | Grant | 219/544 |
| 4,091,267 | 5/1978 | Grant | 219/544 |
| 4,147,927 | 4/1979 | Pirotte | 338/22 R |
| 4,447,799 | 5/1984 | Carlson | 338/22 R |

FOREIGN PATENT DOCUMENTS 2064928 6/1981 United Kingdom ............ 338/22 R

Primary Examiner—E. A. Goldberg
Assistant Examiner—M. M. Lateef
Attorney, Agent, or Firm—Burgess, Ryan & Wayne

[57] ABSTRACT

A PTC thermistor device includes a heat conductive ceramic case having an aperture at one end and a groove recessed from the aperture; a plate-like PTC thermistor body having electrodes thereon, with a first major portion mounted in the groove in such a manner that a clearance is formed between an outer peripheral surface of the plate-like PTC thermistor body and the groove, and having a second minor portion extending outwardly from the groove; a heat resisting binding agent filled in the clearance, for conducting heat from the plate-like PTC thermistor body to the heat conductive ceramic case and for bonding the electrodes with the heat conductive ceramic case; electrode plates connecting a power source to the PTC thermistor body and having a portion extending into the aperture of the heat conductive ceramic case; and a heat resisting binding agent for sealing a space between the extended portion of the electrode plates and the aperture of the heat conductive ceramic case, such that stability against temperature change and thermal stress is high and the PTC thermistor body is completely shielded from the ambient atmosphere by the filling material.

8 Claims, 3 Drawing Figures

POSITIVE TEMPERATURE COEFFICIENT THERMISTOR DEVICE

BACKGROUND OF THE INVENTION

1. Field of the Invention

The present invention relates to a positive temperature coefficient thermistor device which is used, for example, as a heat generating device for heating compressor oil.

2. Description of the Related Art

The positive temperature coefficient thermistor device, hereinafter referred to as the PTC thermistor device, has an automatic temperature-controlling function such that resistance of the positive temperature coefficient thermistor body, hereinafter referred to as the PTC thermistor body, drastically increases upon arrival at a specific temperature, and hence the current conducted through the PTC thermistor body decreases to automatically control the heat generation of the PTC thermistor body. Accordingly, it is not necessary to attach a temperature-control circuit to the PTC thermistor body, since it operates as a constant temperature-heat generator. The PTC thermistor device can therefore be used as a heat generator for various heat-generating devices, although its structure would have to be modified in accordance with the field of application. When the PTC thermistor device is used for heating compressor oil, the PTC thermistor device must have excellent heat conductivity and heat resistance characteristics.

In addition, the PTC thermistor device must be stable against temperature changes caused by the compression of the compressor oil and also against changes in the ambient atmosphere caused by a leakage of the compressor oil. Furthermore, the PTC thermistor device must be able to resist vibration caused by the compressor.

SUMMARY OF THE INVENTION

It is an object of the present invention to provide a PTC thermistor device which can meet the desired characteristics mentioned above.

It is a specific object of the present invention to provide a PTC thermistor device which is used as a heat generating device for heating the compressor oil.

In accordance with the object of the present invention there is provided a PTC thermistor device, comprising: a heat conductive, ceramic case having an aperture at its one end and a groove recessed from the aperture; a PTC thermistor body mounted in the groove in such a way that a clearance is formed between the PTC thermistor body and the groove; means filled in the clearance for conducting heat from the PTC thermistor body to the heat conductive, ceramic case; means for connecting a power source to the PTC thermistor body, a portion of the electrodes forming a part of this means extending into the aperture of the heat conductive, ceramic case; and means for sealing a space formed between the extended portion of the electrodes and the aperture of the heat conductive, ceramic body.

DESCRIPTION OF THE PREFERRED EMBODIMENTS

Figure 1:
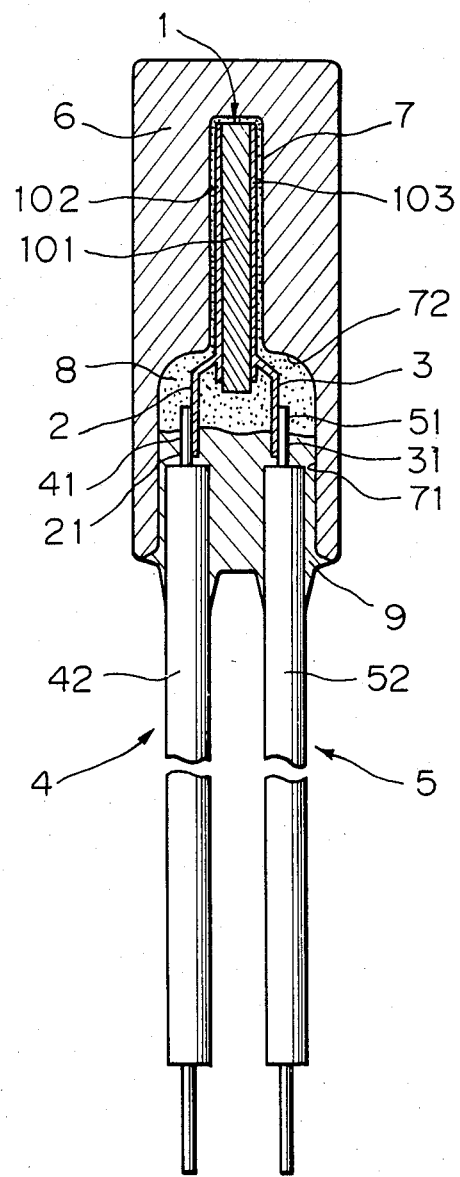
FIG. 1 is a partial longitudinal cross sectional view of the PTC thermistor device according to a preferred embodiment of the present invention.

Referring to FIG. 1, the PTC thermistor body is denoted by reference numeral 1 and is in the shape of a round disc or flat sheet. The electrodes 102 and 103 are brought into ohmic contact with the PTC thermistor element 101 at both major surfaces thereof. The electrodes 102 and 103 are connected to electrode plates 2 and 3, respectively, and are fixed thereto by a conductive binding agent. Core wires 41 and 51 of the lead conductors 4 and 5 are connected and fixed to the ends of the electrode plates 2 and 3, respectively. The lead conductors 4 and 5 are provided with heat-resisting, insulative coatings 42 and 52, respectively, therearound.

The heat conductive, ceramic case, hereinafter referred to as the ceramic case, is denoted by the reference numeral 6. The ceramic case 6 is made of a ceramic material, such as alumina, having a high heat-conductivity. A groove 7 is formed almost at the center of the case 6, as seen along the thickness of the ceramic case 6, in the form of a recess, for mounting or accommodating the PTC thermistor body 1 therein. In the lower part, or a part more to the rear than the part where the groove 7 is formed, an aperture 71 is formed so that the majority of the PTC thermistor body 1 can be inserted therethrough into the groove 7, and further, the means for electrically connecting the PTC thermistor body 1 to the power source (not shown) is positioned therein. This means, as shown in the preferred embodiment of FIG. 1, consists of the electrode plates 2, 3, and lead conductors 4, 5. The borders between aperture 71 and groove 7 are defined by the step 72. The electrode plates 2 and 3 are connected to the PTC thermistor body 7 through the parts of the electrode plates 2 and 3 which extend outwardly from the body 7 and are virtually parallel to the step 72 mentioned above. The connection between the electrode plates 2, 3 and the lead wires 4, 5, and an end of each insulative coating 42, 52, is positioned in the groove 71.

A clearance is formed between the outer peripheral surface of the PTC thermistor body 1 and the inner surface of the groove 7 into which the majority of the PTC thermistor body 1 is inserted. A filling material 8 made of heat-resisting binding agent having a high heat-conductivity, such as the heat-resisting silicone-resin binding agent, is filled into the clearance. The filling material 8 preferably extends from the clearance to a part of the aperture 71, until reaching a level above the ends of the insulative coatings 42, 52.

A sealing material 9 fills the entire vacant space of the aperture 71 or the major part of the vacant space where the filling material 8 is not present, so that the sealing material 9 completely fills this space and adheres to the ceramic case 6, lead conductors 4, 5, and the insulative coatings 42, 52. A heat resisting, silicone resin binding agent is preferred as the sealing material 9.

The diameter and length of the case 6 are, for example, 19 mm and 32.5 mm, respectively, and the length of lead wires 4, 5 exposed outside of the case 6 is, for example, 380 mm.

Figure 2:
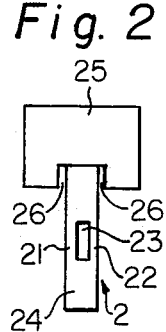
FIGS. 2 and 3 are partial views of an electrode plate according to embodiments of the present invention.
Figure 3:
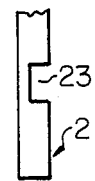

FIGS. 2 and 3 show preferred embodiments of the electrode plate 2 (one of the pair of electrode plates 2, 3 shown in FIG. 1 being shown). The electrode plate 2 comprises a first portion 25 bonded to the ohmic electrode 102 (FIG. 1) and a second portion 24 extending from the first portion 25. The second portion 24 of the electrode plate 2 is provided with a slot 23, thereby forming thin solid regions 21, 22 on each side of the slot 23, respectively. These thin solid regions 21, 22 fuse and disconnect upon conduction of a large current therethrough. Namely, the thin solid regions 21, 22 have a width of from 0.1 to 0.3 mm, in a case where the electrode plate 2 is made of stainless steel, e.g., SUS 304, and these thin solid regions 21, 22 fuse and disconnect when a current of from 20 to 30A is passed therethrough.

The first portion 25 is provided with a recess from which the second portion 24 protrudes, thereby forming spaces 26 between the recess of the first portion 25 and the second portion 24. These spaces are provided so that any mechanical force exerted on the second portion 24 can be effectively transferred to the body or center of the first portion 25, whereby possible destruction of the electrode plate 2 at the joint between the first portion 25 and second portion 24 can be prevented. FIG. 3 shows another example of the fusing means 23, in the form of a recess.

In the PTC thermistor device according to the present invention, the tollowing advantages are attained.

(A) The heat generated in the PTC thermistor body 1 is conducted at a high efficiency through the filling material 8 to the ceramic case 6, and the heat conducting characteristic thereof is therefore excellent.

(B) The ceramic case 6 has an excellent heat resistance, and thus the heat resisting characteristic is excellent.

(C) The ceramic material which constitutes the case 6 has a thermal expansion coefficient which is virtually the same as that of the PTC thermistor element 101. Since the filling material 8 fills the clearance between the ceramic case 6 and the PTC thermistor body 1, the stability against temperature change and thermal stress is therefore high.

(D) The aperture 71 is sealed by the sealing material 9 which has a high adhesion to the ceramic case 6 and the lead wires 4, 5. The PTC thermistor body 1 is therefore completely shielded from the ambient atmosphere, and hence is stable against any change in the ambient atmosphere.

(E) The ceramic case 6, the filling material 8, the sealing material 9, and the PTC thermistor body form a monolithic structure which is highly-resistant to vibration.

We claim:

1. A PTC thermistor device, comprising:
   a heat conductive, ceramic case having an aperture at one end and a groove recessed from the aperture;
   a plate-like PTC thermistor body having electrodes thereon, with a first major portion mounted in the groove in such a manner that a clearance is formed between an outer peripheral surface of the plate-like PTC thermistor body and the groove, and having a second minor portion extending outwardly from the groove;
   a heat resisting binding agent filled in said clearance, for conducting heat from the plate-like PTC thermistor body to the heat conductive, ceramic case and for bonding the electrodes with the heat conductive, ceramic case;
   a means for connecting a power source to the plate-like PTC thermistor body and having a portion comprising electrodes extending into the aperture of the heat conductive, ceramic case; and,
   a heat resisting binding agent for sealing a space formed between said extended electrodes portion and the aperture of the heat conductive, ceramic case.

2. A PTC thermistor device according to claim 1, wherein said heat conductive, ceramic case consists of alumina.

3. A PTC thermistor device according to claim 1, wherein said PTC thermistor body has ohmic electrodes, and said means for connecting the power source to the PTC thermistor body comprises: electrode plates consisting of metal and bonded to the ohmic electrodes; and lead conductors comprising a core wire and insulative coating surrounding the core wire.

4. A PTC thermistor device according to claim 3, wherein said core wire of each lead conductor is exposed outside the insulative coating and is connected to each of said electrode plates.

5. A PTC thermistor device according to claim 3, wherein said electrode plates comprises a means for fusing and disconnection at a conduction of a large current therethrough.

6. A PTC thermistor device according to claim 5, wherein said fusing means is formed by one member selected from the group consisting of a slot and recess formed in said electrode plates.

7. A PTC thermistor device according to claim 3, wherein said electrode plates comprise a first portion bonded to said ohmic electrodes and having a recessed portion and a second portion protruding into the recessed portion of said first portion, and a space formed between said recessed portron of the first portion and the protruding part of said second portion.

8. A PTC thermistor device according to claim 2, 3, 5, or 7, wherein said device is used for heating compressor oil of a refrigerator.

* * * * *